United States Patent [19]

Whittenberger

[11] Patent Number: 5,308,591
[45] Date of Patent: May 3, 1994

[54] CORE BODY FOR CATALYTIC CONVERTER

[75] Inventor: William A. Whittenberger, Hiram, Ohio

[73] Assignee: W. R. Grace & Co.-Conn., New York, N.Y.

[21] Appl. No.: 973,626

[22] Filed: Nov. 9, 1992

[51] Int. Cl.$^5$ .............................................. F01N 3/10
[52] U.S. Cl. ..................................... 422/174; 60/299; 60/300; 60/303; 422/173; 422/177
[58] Field of Search ............... 422/173, 174, 177, 180, 422/199, 211, 222; 55/DIG. 30; 60/299, 300, 303

[56] References Cited

U.S. PATENT DOCUMENTS

| | | |
|---|---|---|
| 4,832,998 | 5/1989 | Cyron. |
| 4,923,109 | 5/1990 | Cyron. |
| 4,928,485 | 5/1990 | Whittenberger ............ 422/180 |
| 5,140,812 | 8/1992 | Cornelison et al. ............ 422/174 |
| 5,146,743 | 9/1992 | Maus et al. . |

FOREIGN PATENT DOCUMENTS

9213636  8/1992  Fed. Rep. of Germany.
WO92/13636  8/1992  PCT Int'l Appl. .

Primary Examiner—Timothy M. McMahon
Attorney, Agent, or Firm—Edward J. Cabic

[57] ABSTRACT

The disclosure relates to an improved catalytic converter core which is characterized by a plurality of spaced rigid centrally located pins about which are wrapped a plurality of corrugated thin metal strips. The configuration of the resulting core is determined by the number of centrally located pins, for example, with two pins the configuration is oval. Electric power may be selectively applied to effect heating of the core. Catalyst may be applied to the surface or surfaces of the corrugated thin metal strips to aid in converting undesirable materials in a gas stream to more acceptable materials.

35 Claims, 4 Drawing Sheets

CORE BODY FOR CATALYTIC CONVERTER

This invention relates to a core body for a catalytic converter, and more particularly to a core body for an electrically heatable catalytic converter. The invention also contemplates an electrically heatable catalytic converter containing the core body hereof.

BACKGROUND OF THE INVENTION AND PRIOR ART

The purpose of a catalytic converter is to enhance a chemical reaction, for example, oxidation. When used with an internal combustion engine or a gas turbine, its purpose is to convert pollutant materials in the exhaust, e.g., carbon monoxide, unburned hydrocarbons, nitrogen oxide, etc., to carbon dixoide, nitrogen, and water. Conventional catalytic converters utilize a ceramic honeycomb monolith having square or triangular straight-through openings or cells with catalyst deposited on the walls of the cells; catalyst coated refractory metal oxide beads or pellets, e.g., alumina beads; or a corrugated thin metal foil honeycomb monolith, e.g., a ferritic stainless steel foil or a nickel alloy foil, having a catalyst carried on or supported on the surface. The catalyst is normally a noble metal, e.g., platinum, palladium, rhodium, ruthenium, or a mixture of two or more of such metals. Zeolite coating may also be used for adsorption and desorption of the pollutants to aid in catalytic activity. The catalyst catalyzes a chemical reaction, mainly oxidation, whereby the pollutant material is converted to a harmless by-product which then passes through the exhaust system to the atmosphere.

However, conversion to such harmless by-products is not efficient initially when the exhaust gases are relatively cold, e.g., at cold start. To be effective at a high conversion rate, the catalyst and the surface of the converter with which the gases come in contact must be at or above a minimum temperature, e.g., 390 F. for carbon monoxide, 570 F. for volatile organic compounds (VOC) and 100 F. for methane or natural gas. Otherwise, conversion to harmless by-products is poor and cold start pollution of the atmosphere is high. It is estimated that as much as 80% of the atmospheric pollution from internal combustion engines occurs within the first 2 minutes of operation. Once the exhaust system has reached its normal operating temperature, the catalytic converter is optimally effective. Hence, it is necessary for the relatively cold exhaust gases to make contact with a hot catalyst so as to effect satisfactory conversion. Compression ignited engines, spark ignited engines, and reactors in gas turbines have this need.

To achieve initial heating of the catalyst at or prior to engine start-up, there is conveniently provided an electrically heatable catalytic converter, preferably one formed of a thin metal honeycomb monolith, which may be spaced flat thin metal strips, straight corrugated thin metal strips, pattern corrugated thin metal strips, (e.g., herringbone or chevron corrugated) or variable pitch corrugated thin metal strips (see U.S. Pat. No. 4,810,588 dated Mar. 7, 1989 to Bullock et al), or a combination thereof. The monolith is connected to a voltage source, e.g., a 12 volt to 108 volt or higher DC power supply, preferably at the time of engine start-up and afterwards to elevate and maintain the catalyst to at least 650 F. plus or minus 30 F. Alternatively, power may be supplied for a few seconds prior to engine start-up.

Catalytic converters containing a corrugated thin metal (stainless steel) monolith have been known since at least the early 19070's. See Kitzner U.S. Pat. Nos. 3,768,982 and 3,770,389 each dated Oct. 30, 1973. More recently, corrugated thin metal monoliths have been disclosed in U.S. Pat. No. 4,711,009 to Cornelison et al dated Dec. 8, 1987; U.S. Pat. No. 4,381,590 to Nonnenmann et al dated May 3, 1983; U.S. Pat. No. 5,070,694 to Whittenberger dated Dec. 10, 1991; and International PCT Publication Numbers WO 89/10470 (EP 412,086) and WO 89/10471 (EP 412,103) each filed Nov. 2, 1989, claiming a priority date of Apr. 25, 1988. The above two PCT Publications disclose methods and apparatus for increasing the internal resistance by placing a group of spaced discs in series or insulating intermediate layers. Another International PCT Publication Number is WO 90/12951 published Apr. 9, 1990 and claiming a priority date of Apr. 21, 1989 which seeks to improve axial strength by form locking layers of insulated plates. Another reference which seeks to improve axial strength is U.S. Pat. No. 5,005,275 dated Oct. 8, 1991 to Kannianen et al. However, a common problem with such prior devices has been their inability to survive severe automotive durability tests which are known as the Hot Shake Test and the Hot Cycling Test.

The Hot Shake Test involves oscillating (100 to 200 Hertz and 28-60 G inertial loading) the device in a vertical attitude at high temperature (between 800 and 950 C.; 1472 to 1742 F., respectively) with exhaust gas from a running internal combustion engine being simultaneously passed through the device. If the device telescopes, or displays separation or folding over of the leading or upstream edges of the foil leaves up to a predetermined time, e.g., to 5 to 200 hours, the device is said to fail the test. Usually, a device that lasts 5 hours will last 200 hours. Five hours is equivalent to 1.8 million cycles at 100 Hertz.

The Hot Cycling Test is conducted with exhaust flowing through at a temperature of 800 to 950 C. (1472 to 1742 F.) and cycled to 120 to 150 C. once every 15 to 20 minutes, for 300 hours. Telescoping or separation of the leading edges of the foil strips is considered a failure.

The Hot Shake Test and the Hot Cycling Test, hereinafter called "Hot Tests," have proved very difficult to survive, and many efforts to provide a successful device have been either too costly or ineffective for a variety of reasons.

Previously stated samples of electrically heatable catalytic converters (EHC) in automotive service and comprised entirely of heater strips in electrical parallel did not have adequate endurance in the Hot Tests nor did they have sufficiently high resistance to fulfill the need for lower power ratings. In repeated efforts to arrive at a suitable design using purely parallel circuit construction, samples were made with a wide range of parameters, including a length-to-diameter aspect ratio of from 0.2 to 1.5, cell densities of from 100 to 500 cells per square inch, individual strip heaters as long as 20 inches, and parallel circuits limited to as few as 2 to 4 heater strips.

Devices made according to these parameters have generally proved unsatisfactory in the Hot Tests because (a) the terminal resistance was too low and, therefore, the devices drew too much power, (b) the relatively high voltage differential between laminations associated with small numbers of parallel heater strips caused some interlaminar arcing, and (c) Hot Tests could not be passed consistently. Resistance that is too low causes one or more of the following problems: (a) the battery, cabling and switching apparatus becomes unacceptably large and expensive; (b) the EHC has to be made with longer heater strips which have a tendency to fail the Hot Tests.

Copending and commonly owned U.S. patent application Ser. No. 826,488 filed Jan. 27, 1992 discloses a generally circular electrically heatable catalytic converter which is capable of surviving the Hot Tests. The present invention is an improvement on this device in that it provides in one embodiment, a device that is oval in cross-section and is capable of surviving the Hot Tests. The oval cross-section enables better ground clearance and better fit-up with existing oval shaped converters. Moreover, these devices are capable of being made in smaller axial dimension, especially for use with smaller displacement engines, e.g., from about 1.5 to 3.0 liters and still meet EPA requirements as of this date on emissions.

In the following description, reference will be made to "ferritic" stainless steel. A suitable formulation for ferritic stainless steel alloy is described in U.S. Pat. No. 4,414,023 to Aggen dated Nov. 6, 1983. A specific ferritic stainless steel useful herein contains 20% chromium, 5% aluminum, and from 0.002% to 0.05% of at least one rare earth metal selected from cerium, lanthanum, neodymium, yttrium, praseodymium, or a mixture of two or more of such rare earth metals, balance iron and trace steel making impurities. Another metal especially useful herein is 99.5% nickel. Still another nickeliferous alloy useful herein is identified as Haynes 214 alloy which, like ferritic stainless steel alloy above described, is commercially available. This alloy is described in U.S. Pat. No. 4,671,931 dated Jun. 9, 1987 to Herchenroeder et al. The alloy is characterized by high resistance to oxidation. A specific example contains 75% nickel, 16% chromium, 4.5% aluminum, 3% iron, optionally trace amounts of one or more rare earth metals except yttrium, 0.05% carbon, and steel making impurities. Still another nickeliferous alloy useful herein is Haynes 230. This alloy contains 22% chromium, 14% tungsten, 2% molybdenum, 0.1% carbon and a trace amount of lanthanum, balance nickel. Ferritic stainless steel (commercially available as Alfa IV from Allegheny Ludlum Steel Co.) and Haynes 214 and 230 are examples of high temperature resistive, corrosion or oxidation resistant metals that are suitable for use in making heater strips for the EHC cores hereof. Suitable metals and alloys must be able to withstand temperatures of 900 C. to 1100 C. over prolonged periods.

Other high temperature resistive, oxidation resistant metals are known and may be used herein. For automotive applications, for example, the thickness of the thin metal foil strips is in the range of from 0.001" to 0.005", preferably 0.0016" to 0.002".

In the following description, reference will also be made to fibrous ceramic mat, woven ceramic fabrics, or insulation. Reference may be had to U.S. Pat. No. 3,795,524 dated Mar. 5, 1974 to Sowman and to U.S. Pat. No. 3,916,057 to Hatch dated Oct. 28, 1975 for formulations and manufacture of ceramic fiber tapes and mats useful herein. One such woven ceramic fiber material is currently available from 3-M under the registered trademark "NEXTEL" 312 Woven Tape useful for isolating groups of heater strips as described below. Ceramic fiber mat is currently available as "Interam" also from 3-M.

BRIEF STATEMENT OF THE INVENTION

Briefly stated, the present invention is a thin metal honeycomb core body for a catalytic converter which comprises in combination (a) a plurality of spaced rigid metal pins, usually 2 such pins; (b) a plurality of groups of corrugated thin metal strips each having a metal connector plate located at a distal extremity thereof and said strips extending in parallel between said rigid metal pins and said metal connector plate; (c) said groups of corrugated thin metal strips being electrically isolated from each other and being bent in the same direction about said rigid metal pins; (d) the connector plates of each group defining a retaining shell portion about said core body in which the connector plates of each group of corrugated thin metal strips are connected together, but the retaining shell portions are electrically isolated from one another; and (e) means for connecting said corrugated thin metal strips to a voltage source whereby an electrical current may flow through the corrugated thin metal strip selectively to effect heating thereof.

BRIEF DESCRIPTION OF THE DRAWINGS

The invention may be better understood by having reference to the annexed showing a preferred embodiment of the present invention and wherein.

DETAILED DESCRIPTION OF THE DRAWINGS

As indicated above, the present invention is a novel core for a catalytic converter, especially an electrically heatable catalytic converter. The core elements are strips of thin corrugated high temperature resistive, corrosion or oxidation resistant thin metal or thin metal alloy strips having oppositely bent metal tabs at each distal extremity. In preferred embodiments, the thin metal strips have a flattened portion intermediate the ends, not necessarily in the middle of the strip. By "thin" as used herein and in the appended claims, is meant 0.001" to 0.005". A distinguishing feature of the present invention is that there is provided a plurality of centrally located pins to which the core element strips are attached and about which the core element strips are wound. Usually, there are two such pins, and in the preferred case, the pins are bifurcated, and desirably in the shape of a cotter pin. The flat portions of the strips are inserted between the legs of the split pin and the outermost layers insulated from the pins. Thus, two groups of corrugated thin metal strips are provided in such a preferred case. These are simultaneously wound about the two or more pins and the result is that the geometric configuration of the core is generally oval or, for example, tri-oval, like some race tracks. This enables the electrically heatable catalytic converter to be placed in close proximity to a conventional oval shaped catalytic converter, for example, one with a ceramic core.

When wound in what may be termed a spiraliform manner, the metal tabs at the distal extremities of the corrugated thin metal strips are in overlapping relation. The tabs at the ends of each strip are oppositely bent, either angularly bent or arcuately bent as disclosed in commonly owned copending application Ser. No. 880,082 filed May 4, 1992 by David T. Sheller or in Ser. No. 886,009 filed May 20, 1992 also by David T. Sheller and commonly owned and copending herewith, to which applications reference may be had. The tabs at each end of the oval are welded together as described in said application to form separated retaining shell portions, one of which may ultimately be attached to one pole of a voltage source, and the other of which can be attached to the other pole of the voltage source. This core is disposed in a housing, preferably of stainless steel, and insulated from the housing by suitable means such as the aforementioned woven ceramic fiber tape, e.g., "NEXTEL." Suitable electrode feed through devices, such as those disclosed in commonly owned copending application Ser. No. 931,313 filed Aug. 17, 1992 by Sheller et al. may be used to conduct power from a suitable voltage source, usually a DC battery or battery system having a voltage rating of from 12 to 108 or more volts. When the core is so housed and provided with adaptor end caps as described below, there is provided an electrically heatable catalytic converter in accordance with the present invention.

Figures 1, 2:
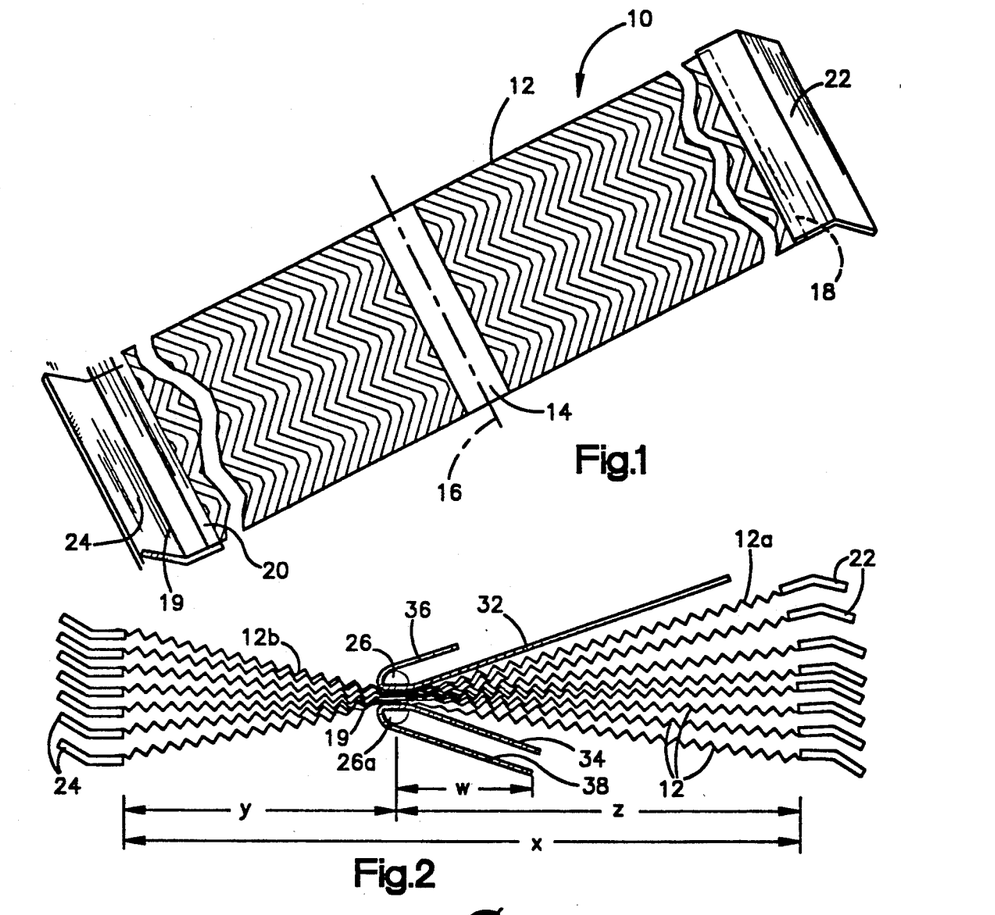
FIG. 1 is a perspective view of a corrugated thin metal strip having a flattened portion intermediate the ends, and connectors secured to each of the distal extremities of the strip.
FIG. 2 is an edge view of a group of corrugated thin metal strips having their flattened portions disposed between the legs of a split, or bifurcated pin, such as a cotter pin, and showing the connector plates in generally overlapping relation. Insulation tapes are also shown.

Referring now more particularly to the drawings, FIG. 1 shows a core element 10 useful herein. The core element is formed from a strip of thin, e.g., 0.002" thick, high temperature resistive, corrosion resistant metal or metal alloy 12 such as Haynes 214, Haynes 230, or a ferritic stainless steel. The strip 12 may be continuously corrugated from end to end, or more desirable, with a flat portion 14 intermediate the ends, and coated with a thin coating of a refractory metal oxide, for example 0.0002" to 0.00015" thick, and having at least one overlaid catalyst metal deposited thereon, by a process such as described in U.S. Pat. No. 4,711,009, supra. In using the foregoing process, the final steps of creasing and accordion folding are omitted. Cutting the precoated strip to a predetermined length, flattening an intermediate portion and the ends, and wire bushing the coating from the ends are steps which are added to the process described in said U.S. Patent. Alternatively, the finished corrugated strip may be stamped and then coated with a refractory metal oxide coating, e.g., alumina, titania, alumina/ceria, titania/alumina, titania/ceria, magnesia/zirconia, etc. A preferred refractory metal oxide composition is 75% gamma alumina/25% ceria. The coating may be applied by washcoating followed by calcining, or by plasma spray. A noble metal catalyst, e.g., platinum, palladium, rhodium, ruthenium or a mixture thereof, e.g., platinum/rhodium, is then applied to the surface. The strip 12 as shown in FIG. 1, is provided with a herringbone corrugation pattern. This pattern prevents nesting between contiguous layers of the strips 12 and provides for mixed flow of the exhaust gas along a zig-zag path from inlet to outlet. A straight-through flow follows an axial path straight through from inlet to outlet and is preferred where low back pressure is a principal desired property of the converter.

Figure 3:
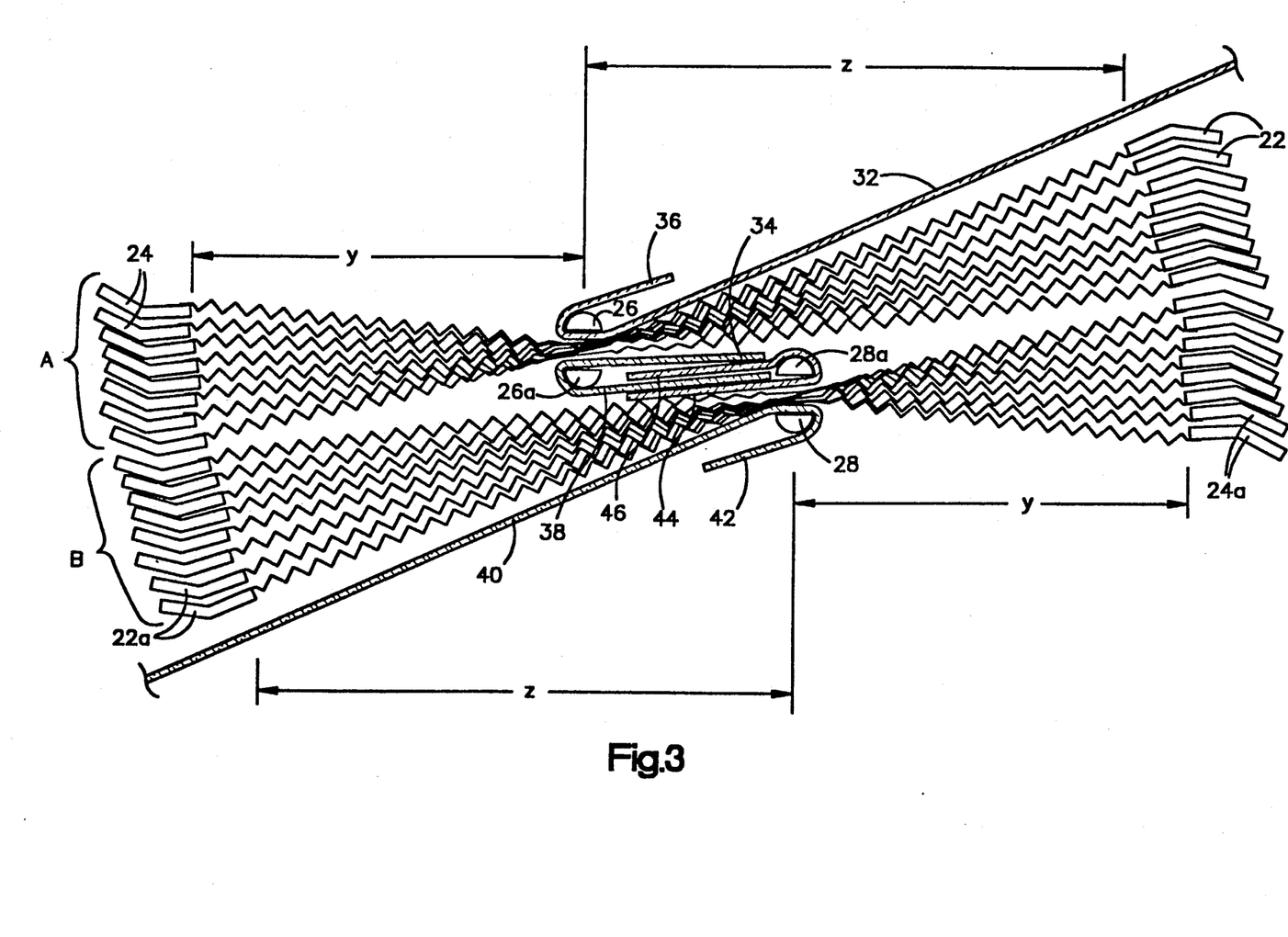
FIG. 3 shows a pair of spaced split pins each having a group of corrugated thin metal strips having their flattened portions disposed between the legs of the respective split pins with the connector plates in generally overlapping relation, and showing the position and location of insulator tapes prior to tightly winding the assembly of FIG. 3 about an axis located between the split pins.
Figure 4:
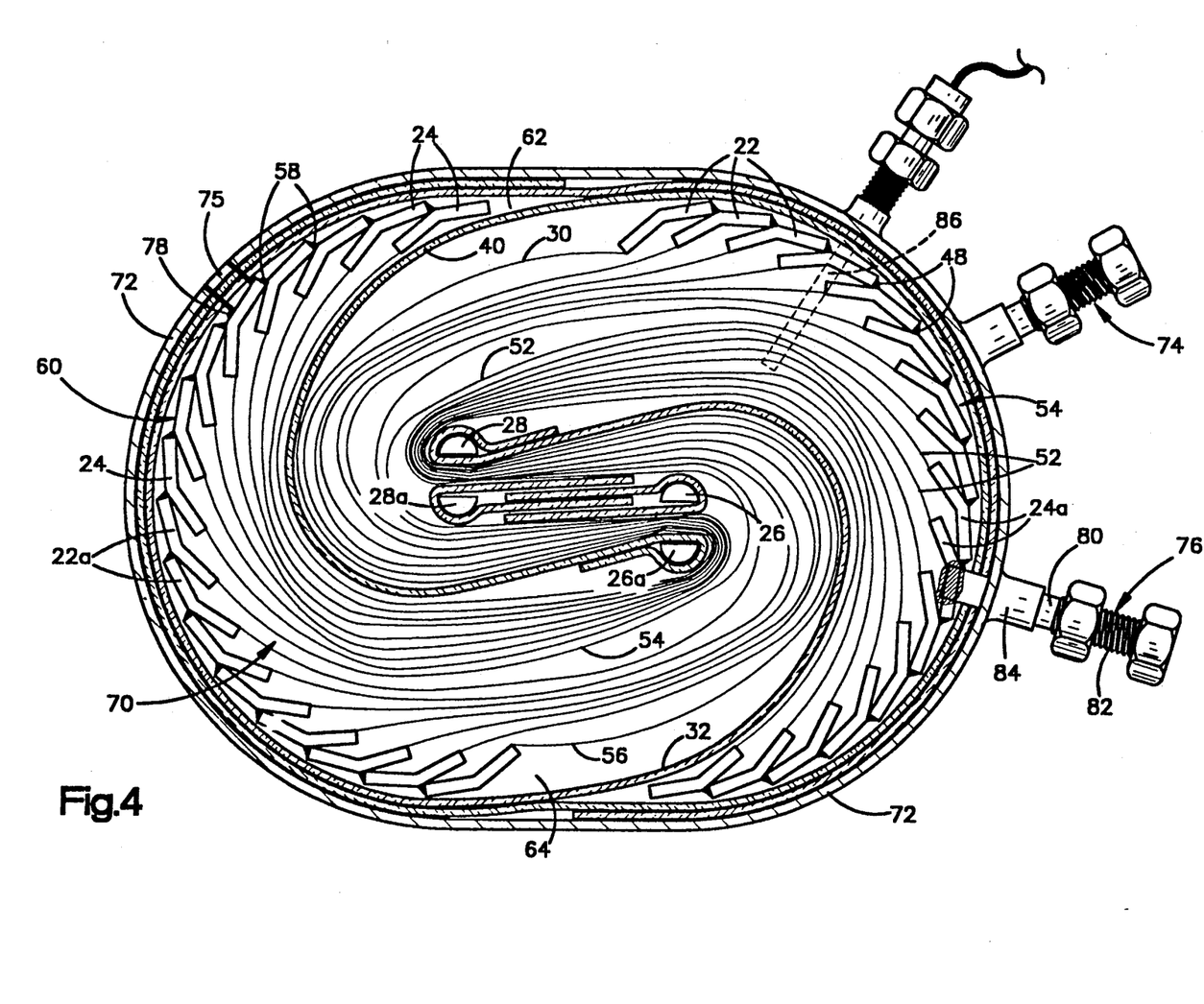
FIG. 4 shows a cross-sectional view of an electrically heatable catalytic converter in accordance herewith from the upstream end of the core and showing the terminals for a thermocouple and for the electrical connections to a voltage source, not shown. Also shown are the connector plates welded in overlapped relation and defining a pair of retaining shell portions.
Figure 6:
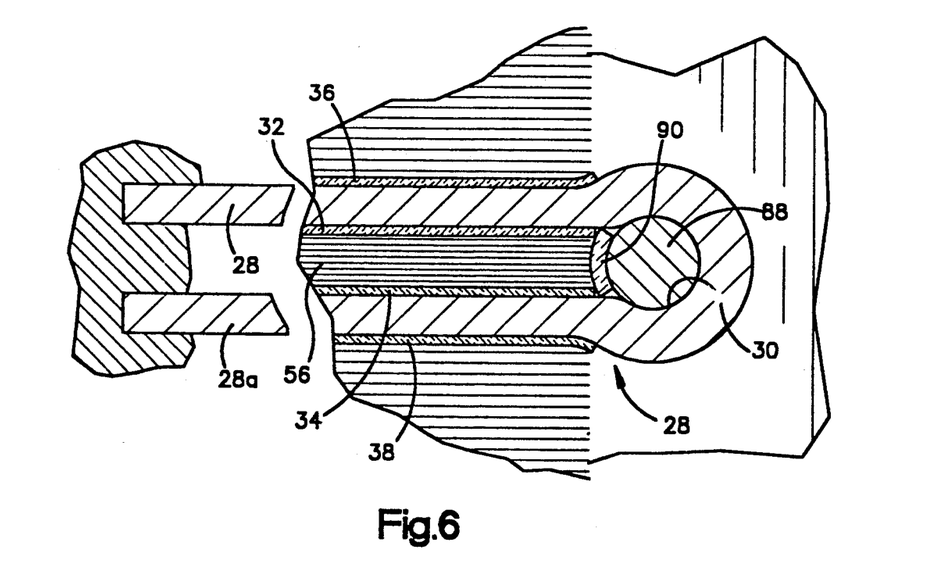
FIG. 6 is a fragmentary cross-sectional view on an enlarged scale of a split pin structure as it appears in the plane indicated by the line 6—6 in FIG. 5.

The strip 12 is provided with an intermediate flat portion 14 spanning the center-line 16. The line 16 is the center-line of the flat portion 14, and not necessarily the center-line of the corrugated thin metal strip 12. This is conveniently accomplished by flattening the portion 14 of the pre-coated, pre-catalyzed corrugated strip. The flat portion 14 is from $\frac{1}{8}$th" to $\frac{3}{4}$" wide, e.g., $\frac{3}{8}$ths". The ends 18 and 20 of the strip 12 are flattened and wire brushed to remove the refractory metal oxide coating to enable welding of the strips 12 to the tabs 22 and 24. Tabs 22 and 24 are angularly bent along a single transverse line 19 from 15 degrees to about 35 degrees, preferably about 26 degrees, out of the plane of the tab. The tabs may be bent along more than one line, e.g., 2 to 10 lines, up to an infinite number of longitudinal lines to form a circular arc. The bend line 19, for example, is preferably midway between the longitudinal edges of the tab, although displacement from the longitudinal centerline up to as much as 0.2" may occur. The tabs 22 and 24 are secured to the ends 18 and 20, respectively, of the thin metal strip 12, one tab being in a concave position (24) and the other being in a convex position (22) relative to the surface of the strip 12. Thus, when the strips 12 in groups A and B (FIG. 3) are wound about the pins 26-26a and 28-28a in a spiraliform manner as shown in FIGS. 3, and 4 and 6, the tabs 22 and 24 overlap incompletely owing to the longer path one corrugated path of the strip (12a or 12b) must follow with respect to an adjacent strip 12 and its parts 12a and 12b. Usually 6 to 8 strips 12 form a group A or a group B.

Referring now to FIG. 2, there is here shown a single group of heater strips collected at their flattened portions 14 between the bifurcated legs 26 and 26a of a cotter pin 28 having an eye 30 therein (See FIG. 6). The corrugated thin metal strips are of a predetermined length X, and in a specific embodiment, X=11.62" between tabs 22 and 24; the distance Y=4.81", and the distance Z=6.81". As shown in FIG. 2, insulation strips 32 and 34 are provided and looped around the legs 26 and 26a, respectively. The insulation strip 32 is longer than insulation strip 34 and may be of sufficient length that it may be wrapped around the wound core as many as 2 or 3 times to insulate the core from the housing as later described. These strips are conveniently woven ceramic fiber tapes, e.g, "NEXTEL", about 1" wide in a specific example. The short strip 36 (which is an extension of the strip 32) and the short strips 34 and 38 have a length W, which in the specific case illustrated, W=1.75". As shown below, the core body may desirably be wrapped in a ceramic fiber mat, e.g., "INTERAM" about 3/16ths" thick.

Figure 5:
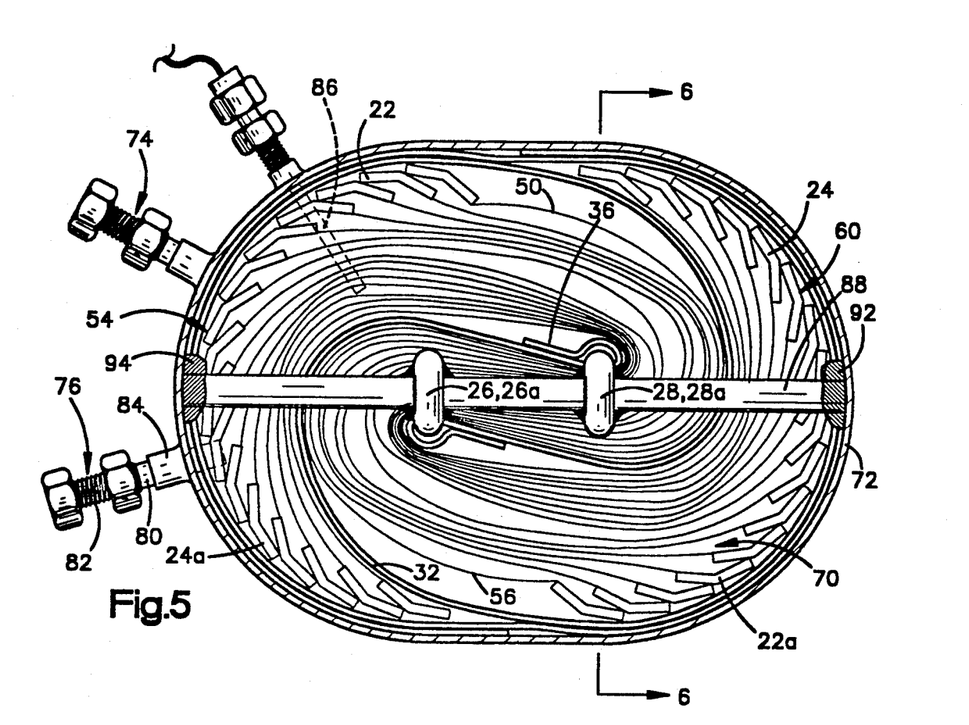
FIG. 5 is a cross-sectional view of an electrically heatable catalytic converter such as shown in FIG. 4 from the downstream end of the core and showing the transverse bar extending through eyes in the cotter pin shaped split pins and welded to a housing.

Referring now to FIG. 3, here two groups A and B are assembled in preparation for winding tightly in a spiraliform manner as illustrated in FIGS. 4 and 5. Note that the lengths Y and Z in Group A are reversed in Group B. Spiraliform winding is done about an imaginary center located midway between the bifurcated pins 26-26a and 28-28a. As shown in FIG. 4, the direction of winding is counter-clockwise. Also, the short insulation strips 34 and 38 of group A are interleafed with the shorter strips 44 and 46 of Group B. This is to ensure that Groups A and B are electrically isolated from the pins 26-26a and 28-28a. This end may also be achieved by coating the surface of the pins with a refractory metal oxide (such as one of those mentioned above) preferably by plasma spray application of a material such as alumina. The bent tabs 22 of group A are in electrical contact with each other and with the bent tabs 24a when they are ultimately welded together in the position shown in FIG. 4, for example; and the bent tabs 24 of Group A are in electrical contact with each other and with the bent tabs 22a of Group B when they are ultimately welded together as shown in FIG. 4.

As best shown in FIG. 4, the bent tabs 22 of Group A after winding are in overlapped relation and welded as at 48. Group A contains 8 corrugated strip core elements 50 shown as lines in FIGS. 4 and 5 for clarity. Group B also contains 8 corrugated strip core elements 52. Thus, there is a total of 16 bent tabs 22 and 24a, welded together and forming a generally semicircular retaining shell segment generally indicated at 54. In like manner, the bent tabs 24 of Group A are in overlapped relation and welded as at 56. Group A contains the opposite ends of the 8 corrugated strip core elements 54 also shown in lines in FIGS. 4 and 5 for clarity. The core elements 54 are continuous with the core elements 50, and the core elements 52 are continuous with the core elements 56. Group B also contains 8 corrugated strip core elements 56. Thus, there is a total of again 16 bent tabs 24 and 24a, welded together and forming an oppositely directed generally semicircular retaining shell segment generally indicated at 60. The retaining shell segments 54 and 60 are spaced and thus electrically isolated from each other as shown at the top and at the bottom of FIG. 4, as the space 62 at the top and the space 64 at the bottom. It is through these spaces that the long tails or extensions 32 and 40 (FIG. 3) of the insulation strips 32 and 40 exit the core 70 and may be wrapped around the core 70. As indicated above, instead of using the woven ceramic fiber tape insulation strips 32 and 40 as the means for insulating the core from the housing, a ceramic fiber may be used to economic advantage. The spacers 62 and 64 together with the semicircular segments 54 and 64 give the device its oval or race track configuration. The core 70 is contained in a housing 72 which is continuous about the outer periphery of the core 70 including the wrapped insulation strips 32 and 40.

FIG. 5 is a view on a reduced scale from the reverse side of the core 70. Here, the bent tabs are directed in the opposite direction from that shown in FIG. 4, and the direction of winding appears to be clockwise compared to FIG. 4. The side shown in FIG. 4 is the upstream side of the device through which untreated exhaust gas enters the converter and FIG. 5 is the downstream of the device through which pollutant depleted exhaust gas exits the device. Terminals 74 and 76 provide a place for attachment of the leads from the poles of a battery or other power source. The terminal 74 may be attached directly to the housing 72 which, in turn is attached directly to the tabs 24 and 22a of groups A and B by a stud 75 welded to a tab 24, for example, and to the housing 72. In some cases it may be found desirable to use a feed-through terminal like the terminal 76 used in connection with the negative pole. The terminal 766 extends through the housing 72 and is insulated therefrom by a ceramic coating 80 applied to the shank 82 as by plasma spray. The shank or stud 82 is held in place by a collar 84 having an interference fit with the coated stud 82, which is, in turn, welded to the housing 72. Terminals or electrode feed throughs of this type are disclosed in commonly owned, copending application Ser. No. 931,313 filed Aug. 17, 1992.

Thus, power from a voltage source, not shown, flows from the retainer shell portion 54 through the corrugated thin metal strips to the opposite retainer shell portion 60 effecting resistance heating of the core. The temperature may be sensed by the thermocouple 866 and suitable controlled in response thereto.

Referring again to FIG. 5, there is shown a metal bar 88, conveniently of stainless steel, and extending through the eyes, e.g., the eye 30, of the pins (See FIG. 6) and attached as by welding at each end, as at 92 and 94, to the housing 72. The bar 88 is provided with a dielectric ceramic coating 90, e.g., a plasma applied refractory metal oxide, such as alumina, to space the bar 88 from the edges of the thin metal strips 56, for example, to prevent shorting. As shown in FIG. 6, the legs of the pin 28-28a are insulated from the thin metal strips by the woven ceramic fiber tapes 36-32, and 34-38 (not shown in FIG. 5; see FIG. 3). Instead of insulator strips of woven ceramic fiber tapes, the surfaces of the bifurcated legs 28 and 28a may be coated with an insulative coating, e.g., plasma applied refractory metal oxide such as those refractory metal oxides mentioned above. Current does not flow through the bar 88. The bar 88 is welded to the cotter pin eyes, e.g., eye 30. The coating 90 on the bar 88 rests against the edges of the thin metal foil strips, e.g., strips 56, and, being on the downstream side of the core 70, prevents telescoping of the core 70 and enables it to pass the Hot Tests.

Figure 7:
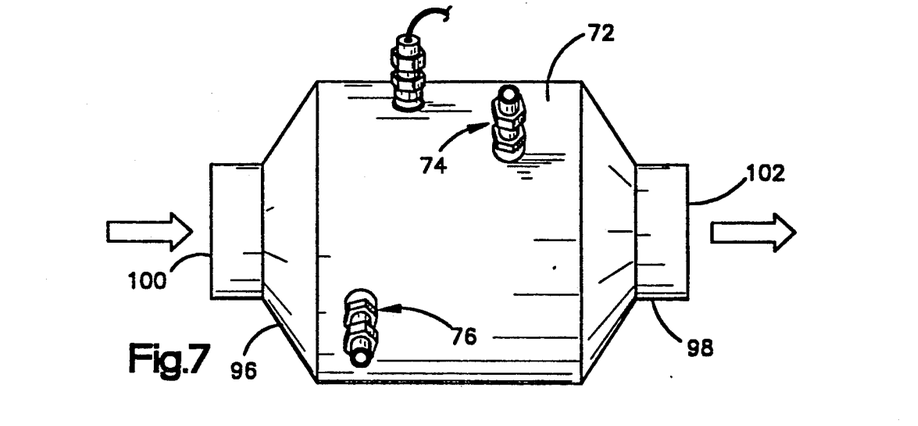
FIG. 7 is a plan view of the outside of a catalytic converter in accordance herewith showing end cap adaptors attached to the housing surrounding the core.

FIG. 7 is an end view of the outside of the catalytic converter as finally assembled showing the housing 72 having end caps 96 and 98 attached thereto as by seam welding, and having nipples 100 and 102 sized to accommodate an automotive exhaust pipe, not shown. The arrows show the direction of exhaust gas flow from the inlet end cap 96 to the outlet end cap 98.

There has thus been provided a novel oval shaped catalytic converter which may be selectively heated, and characterized by a plurality of spaced, rigid, centrally located pins, a plurality of groups of corrugated thin metal strips each having a metal connector plate located at the distal extremities thereof, and extending in parallel between the centrally located pins and the connector plates. The groups are electrically isolated from each other and from the centrally located metal pins. The groups are simultaneously wound in a spiraliform manner about the pins, whereupon the connector plates at the ends of the corrugated thin metal strips overlap and form spaced retaining shell segments. The segments are attached to the poles of a voltage source whereby electric current may be applied selectively to the corrugated thin metal strips to effect heating thereof. The centrally located pins are attached to a bar on the downstream side of the core to prevent telescoping of the core.

What is claimed is:

1. An oval thin metal honeycomb core body for a catalytic converter comprising in combination: (a) a plurality of spaced rigid metal pins; (b) a plurality of groups of corrugated thin metal strips each having a metal connector plate located at the distal extremity thereof and said strips extending in parallel between said rigid metal pins and said metal connector plates; (c) said groups of corrugated thin metal strips being electrically isolated from each other and being bent in the same circular direction about a center intermediate said rigid metal pins; (d) the connector plates of each group of corrugated thin metal strips each defining a retaining shell portion about said core body in which the connector plates of each group of corrugated thin metal strips are connected together, said retaining shell portions being electrically isolated from one another; and (e) means for connecting said corrugated thin metal strips to a voltage source whereby an electrical current may flow through the corrugated thin metal strips selectively to effect heating thereof.

2. An oval thin metal honeycomb body for a catalytic converter comprising in combination (a) a plurality of spaced pairs of closely spaced metal pins; (b) a plurality of groups of corrugated thin metal strips each of said metal strips having a flattened portion located between the ends of each of said thin metal strips and a metal connector plate located at each end of each of said corrugated thin metal strips; (c) groups of said corrugated thin metal strips being located at their flattened portions between each of said closely spaced rigid metal pins and means for insulating said groups from said rigid metal pins without insulating said corrugated thin metal strips in a given group from each other; said groups being bent, respectively, in the same circular direction about a center intermediate said spaced pairs of closely spaced rigid metal pins; (e) said connector plates defining at least a pair of retaining shell portions about said core body in which the retaining shell portions are electrically isolated from one another; and (f) means for connecting said electrically isolated retaining shell portions are electrically isolated from one another; and (f) means for connecting said electrically isolated retaining shell portions to a voltage source whereby current may flow through the corrugated thin metal strips selectively to effect heating of the core body.

3. A thin metal honeycomb core body as defined in claim 1 wherein rigid metal pin is a two member split pin.

4. A thin metal honeycomb core body as defined in claim 3 wherein the surface of the two member split pin has an insulative coating thereon.

5. A thin metal honeycomb body as defined in claim 4 wherein the insulative coating is a plasma applied refractory metal oxide.

6. A thin metal honeycomb core body as defined in claim 5 wherein the refractory metal oxide is alumina.

7. A thin metal honeycomb core body as defined in claim 3 wherein the rigid metal pin has the shape of a cotter pin.

8. A thin metal honeycomb core body as defined in claim 2 wherein the rigid metal pin is a two member split pin.

9. A thin metal honeycomb core body as defined in claim 8 wherein the rigid metal pin has the shape of a cotter pin.

10. A thin metal honeycomb core body as defined in claim 1 wherein the groups of corrugated thin metal strips are electrically isolated by means of an insulative layer interposed between the outermost corrugated thin metal strip of a given group and the rigid metal pin.

11. A thin metal honeycomb core body as defined in claim 10 wherein the insulative layer is a dielectric coating adhered to the surface of the outermost corrugated thin metal strip.

12. A thin metal honeycomb core body as defined in claim 10 wherein the insulative layer is a woven ceramic fiber tape.

13. A thin metal honeycomb core body as defined in claim 2 wherein the groups of corrugated thin metal strips are electrically isolated by means of an insulative layer interposed between the outermost corrugated thin metal strip of a given group and the legs of the closely spaced rigid metal pin.

14. A thin metal honeycomb core body as defined in claim 13 wherein the insulative layer is a dielectric coating adhered to the surface of the outermost corrugated thin metal strip.

15. A thin metal honeycomb core body as defined in claim 13 wherein the insulative layer is a woven ceramic fiber tape.

16. A thin metal honeycomb core body as defined in claim 1 wherein the corrugated thin metal strips are a high temperature resistive, corrosion resistant metal alloy.

17. A thin metal honeycomb core body as defined in claim 2 wherein wherein the corrugated thin metal strips are a high temperature resistive, corrosion resistant metal alloy.

18. A thin metal honeycomb core body as defined in claim 13 wherein the metal alloy is stainless steel.

19. A thin metal honeycomb core body as defined in claim 17 therein the metal alloy is stainless steel.

20. A thin metal honeycomb core body as defined in claim 1 wherein the corrugated thin metal strips are a metal comprising nickel.

21. A thin metal honeycomb core body as defined in claim 2 wherein the corrugated thin metal strips are a metal comprising nickel.

22. A thin metal honeycomb core body as defined in claim 17 wherein the metal comprising nickel is at lest 99.5% nickel.

23. A thin metal honeycomb core body as defined in claim 20 wherein the metal comprising nickel is a nickel alloy comprising nickel, chromium, aluminum and iron.

24. A thin metal honeycomb core body as defined in claim 21 wherein the metal comprising nickel is at least 99.5% nickel.

25. A thin metal honeycomb core body as defined in claim 21 wherein the metal comprising nickel is a nickel alloy comprising nickel, chromium, aluminum, and iron.

26. A thin metal honeycomb core body as defined in claim 2 wherein the thin metal strips are corrugated so as to be nonnesting.

27. A thin metal honeycomb core body as defined in claim 26 wherein the corrugated thin metal strips are corrugated in a herringbone pattern.

28. A thin metal honeycomb core body as defined in claim 26 wherein the corrugated thin metal strips are corrugated in a straight-through nonnesting pattern.

29. A thin metal honeycomb core body as defined in claim 2 wherein the corrugated thin metal strips are alternated with flat metal strips.

30. A thin metal honeycomb core body as defined in claim 2 wherein the corrugated thin metal strips have a coating of a refractory metal oxide on at least one surface thereof.

31. A thin metal honeycomb core body as defined in claim 2 wherein the corrugated thin metal strips have a catalyst on the surface thereof.

32. A thin metal honeycomb core body as defined in claim 31 wherein the catalyst is a noble metal.

33. A thin metal honeycomb core body as defined in claim 9 wherein each cotter pin has an eye in one end and a transverse support bar extending through said eye and normal to the rigid legs thereof, said bar having an insulating coating therein in contact with the downstream ends of the corrugated thin metal strips.

34. An oval thin metal honeycomb core body as defined in claim 2 wherein the corrugated thin metal strips are a nickel/chromium/aluminum/iron alloy; the strips are corrugated in a herringbone pattern; the corrugated thin metal strips are coated on both sides with a refractory metal oxide coating and have a noble metal catalyst deposited on the surface thereof; the plurality of spaced pairs of closely spaced rigid metal pins are in the shape of cotter pins each of which has an eye; a transverse support bar extending through said eyes and in contact with the downstream edges of said corrugated thin metal strips, and a ceramic coating on said transverse bar to electrically isolate said bar from the edges of said corrugated thin metal strips.

35. An oval electrically heatable catalytic converter comprising (1) a housing, (2) end cap adapters for each end of the housing for adapting said converter for insertion in an exhaust line, (3) a thin metal honeycomb core body as defined in claim 2, (4) insulation means between the housing and said core body, (5) at least one feed-through terminal extending through the housing and secured to at least one of said groups of connector plates and adapted to be attached to one pole of a voltage source, a second feed-through terminal for attachment to another of said groups of connector plates and adapted to be attached to another pole of said voltage source, and (7) a voltage source.

* * * * *